United States Patent
Kang et al.

[11] Patent Number: 6,133,404
[45] Date of Patent: Oct. 17, 2000

[54] POLYESTER AND FORMATION PROCESS THEREOF

[75] Inventors: Hye Jung Kang, Sungnam; Sang Soon Park, Seoul; Yong Joo Kim, Euwang, all of Rep. of Korea

[73] Assignee: National Institute of Technology and Quality, Kwacheon, Rep. of Korea

[21] Appl. No.: 09/241,848

[22] Filed: Feb. 2, 1999

[51] Int. Cl.[7] ............................... C08G 63/78; C08J 5/49
[52] U.S. Cl. .................. 528/279; 528/281; 528/285; 528/286; 528/300; 528/301; 528/306; 528/307; 528/308; 528/308.6; 524/706; 524/709; 524/710; 524/713
[58] Field of Search ....................... 528/279, 281, 528/285, 286, 300, 301, 302, 306, 307, 308, 308.6; 524/706, 709, 710, 713

[56] References Cited

U.S. PATENT DOCUMENTS

| | | | |
|---|---|---|---|
| 3,927,052 | 12/1975 | Vizurraga | 260/429.7 |
| 4,269,945 | 5/1981 | Vanderhider et al. | 521/159 |
| 4,337,181 | 6/1982 | Otey et al. | 523/128 |
| 4,859,743 | 8/1989 | Anbrose et al. | 525/443 |

*Primary Examiner*—Samuel A. Acquah
*Attorney, Agent, or Firm*—Staas & Halsey LLP

[57] ABSTRACT

A biodegradable polyester is formed by carrying out esterification and polycondensation with a carboxylic acid monomer group comprising at least one aliphatic dicarboxylic acid containing 2 to 14 carbon atoms and at least one aromatic or alicyclic carboxylic acid, and at least one glycol in the presence of a composite catalyst comprising a titanium compound, a zinc compound, an antimony compound and a phosphorous compound. The composite catalyst significantly improves the reaction rate of polyester polymerization as well as increases the production amounts of the polyester, as compared with conventional catalysts. The polyester is high in molecular weight, excellent in thermal and mechanical properties by virtue of the introduction of the aromatic or alicyclic carboxylic acid or its derivative, in addition to showing good biodegradability. This polyester can replace preexisting, expensive aliphatic polyesters.

22 Claims, No Drawings

POLYESTER AND FORMATION PROCESS THEREOF

TECHNICAL FIELD

The present invention relates to a polyester. More particularly, the present invention relates to a high-molecular weight polyester which is superior in biodegradability as well as in thermal and mechanical properties, such as melting point, tensile strength, tear strength, etc. Also, the present invention is concerned with a process for forming such a polyester.

BACKGROUND ART

General-purpose plastics are widely used for such products as require semi-permanency by virtue of their processability and chemical stability. In contrast to the semi-permanent products, plastic products such as disposable food vessels, waste envelopes, shock-absorbers for packages, etc, are short-lived. It is preferable in the view of preventing environmental pollution that the short-lived plastic products are degraded fast when they are discarded after use. Now, active research has been directed to the development of degradable plastics.

Depending on degradation mechanisms, degradable plastics are divided largely into biodegradable (Japanese Pat. Laid-Open Nos. Heisei 4–189822, Heisei 1–156319, Showa 59–213724, Showa 58–150525), biodeintegratible, and photodegradable ones. For the preparation of the biodegradable plastics, the following three-type materials are known to be used: microorganisms products, natural polymers, and microorganism-degradable synthetic polymers. Of the synthetic polymers, only aliphatic polyesters are completely degraded.

Polytetramethylene succinate, an aliphatic polyester, made mainly of succinic acid and tetramethylene glycol, is superior in thermal properties and is regarded as one of the most promising materials for industrialization. In addition to being expensive, however, aliphatic polyester shows faulty elongation and tear strength upon molding into film. These disadvantages incite an attempt to be made to modify the polyester with aliphatic carboxylic acids, such as adipic acid, or their derivatives, and with aliphaticalkylene glycols, such as ethylene glycol, or their derivatives, so as to give polyester compositions an improvement in film-moldability. However, most of these compositions are lower in melting point by 20–50° C. and relatively poor in mechanical properties including tear strength, as compared with polytetramethylene succinate.

In Japanese Pat. Laid-Open Nos. Heisei 5–70577, 70578 and 70579 and U.S. Pat. Nos. 4,269,945 and 4,859,743, materials of isocyanate group are suggested to serve as chain extenders with the aid of which aliphatic polyesters with large molecular weights are prepared. After discard, these aliphatic polyesters are not completely decomposed in soil owing to the crosslink between main chains. Even if they are degraded, the isocyanate groups used remain, causing significant secondary soil pollution.

As a solution for improved biodegradability and mechanical properties in polyester, complexes of polyesters and biodegradable materials, for example, polyesters and natural materials, polyolefins and natural materials such as cellulose, starch, etc. (U.S. Pat. No. 4,337,181 and E.P. Nos. 400,531, 404,723 and 376,201), polyolefins and polyesters, and polyesters and polyesters, have been actively studied. The complexes have an advantage of being easily prepared using existing extruder technology by a conventional processes. However, since polyester materials and other materials are very poor in compatibility or affinity, the blending ratios therebetween are very limited. More than their limit causes the components to respectively aggregate, leading to non-uniform product quality and decreased mechanical properties.

Compared with aliphatic polyesters, aromatic polyesters such as polyethylene terephthalate, are low-priced and excellent in almost all properties including mechanical strength, thermal resistance, electrical insulation, etc., so they are widely used in fibers, films, and industrial materials. Aromatic polyesters does not show degradability at all nor are they themselves used as degradable materials.

With the aim of introducing such excellent properties of aromatic polyesters into degradable polyesters, aromatic polyesters and aliphatic polyesters were blended. Although the resulting blends are much improved in mechanical properties, phase separation occurs therebetween, so that the aliphatic polyesters only are degraded while the aromatic polyesters remain non-degraded.

It was reported in Journal of Applied Polymer Science, 26, 441, 1981) that aromatic/aliphatic polyesters are not degradable when the aromatic blocks in their intramolecular structures are long whereas they can be degraded when the aromatic blocks are short. The aromatic block in the aromatic/aliphatic polyester cannot be shortened by a simple blending technique. Random polymerization with component monomers makes the aromatic block as short as possible.

Since then, biodegradable copolyesters have been prepared by use of aliphatic monomers and aromatic monomers. They, except for those into which succinic acid, terephthalic acid and tetramethylene glycol are introduced, are insufficient in degradability, thermal properties mechanical properties, and cost.

Polyester's structures and physical properties, particularly, molecular weight distributions and mechanical properties, are greatly determined by the catalysts and monomers used upon its polymerization.

As for the catalysts, they are usually selected from the metal compounds of zirconium, potassium, antimony, titanium, germanium, tin, zinc, manganese and lead. It is well known that the kinds of the metals and their coordinated complexes give a great influence on the reaction rate, thermal properties, mechanical properties and molecular weight distribution of the polyester produced. Thus, it is very important to select appropriate catalysts for improving the reaction rate and mechanical properties of polyesters.

Usually, tin compounds, particularly, monobutyltin oxide or dibutyltinoxide, are widely used in the ester reaction of aliphatic and aromatic starting materials. The tin compounds are excellent in catalytic activity, but because the tin compounds are highly apt to be oxidized, a clouding phenomenon appears on the products when they are exposed to the air for a long period of time. So, their use, if possible, is restrained.

In preparing polyesters, a titanium compound, particularly, tetrabutyl titanate or titanium isopropoxide, is used as a polycondensation catalyst by virtue of its high catalytic activity. However, large amounts of these catalysts are required. Further, the resulting products are so poor in thermal stability that they are easily discolored. When raising the temperature of the polycondensation, a yellowing phenomenon is obviously surfaced on the polyester products.

In order to solve the above-mentioned problems, a great deal of research has been made on catalysts and additives.

For example, for the purpose of time reduction and color improvement, there are used silicon compounds and titanium compounds (U.S. Pat. No. 3,927,052), antimony trioxide, cobalt compounds and phosphorous compounds (Japanese Pat. Laid-Open Publication No. Sho. 53–51295), or antimony compounds and organic acids (Japanese Pat. Laid-Open Publication No. Sho. 60–166320), antimony compounds, cobalt compound and alkaline metal compounds (Japanese Pat. Laid-Open No. Sho. 49–31317), antimony compounds, tin compounds, cobalt compounds, alkali, and phosphorous compounds (Japanese Pat. Laid-Open No. Sho. 62–265324). Most of these techniques, however, cannot reduce the reaction time in both ester reaction and polycondensation nor bring about a remarkable improvement in the color of the products.

DISCLOSURE OF THE INVENTION

Therefore, it is an object of the present invention to overcome the above problems encountered in prior arts and to provide a polyester which shows superior thermal and mechanical properties as well as excellent biodegradability.

It is another object of the present invention to provide a process for forming a biodegradable polyester, by which not only can the reaction rate of polyester polymerization be significantly reduced, but also the production amounts of the biodegradable polyester can be increased.

In accordance with the present invention, the above objects could be accomplished by a provision of a process for forming a polyester, in which a carboxylic acid monomer group comprising at least one aliphatic dicarboxylic acid containing 2 to 14 carbon atoms and at least one aromatic or alicyclic carboxylic acid, and at least one glycol are subjected to esterification and polycondensation in the presence of a composite catalyst comprising a titanium compound, a zinc compound, an antimony compound and a phosphorous compound.

The composite catalyst comprising the titanium compound, zinc compound, antimony compound and phosphorous compound allows significant improvement in the reaction rate of polyester polymerization as well as a great increase in the production amounts of polyester. In addition, the introduction of an aromatic or alicyclic carboxylic acid or its derivative as a part of the carboxylic acid component, results in high-molecular weight polyesters which show excellent thermal and mechanical properties in addition to being superior in biodegradability.

BEST MODES FOR CARRYING OUT THE INVENTION

The process for forming polyesters, according to the present invention, is characterized in that a carboxylic acid monomer group comprising aliphatic dicarboxylic acids containing 2 to 14 carbon atoms and/or their derivatives, and aromatic or alicyclic carboxylic acid and/or their derivatives, and a glycol group are subjected to esterification and polycondensation in the presence of a composite catalyst comprising a titanium compound, a zinc compound, an antimony compound and a phosphorous compound.

Examples of the aliphatic dicarboxylic acids containing 2–14 carbon atoms include succinic acid, glutaric acid, malonic acid, oxalic acid, adipic acid, sebacic acid, azelaic acid, and nonandicarboxylic acid. Useful derivatives are the alkyl esters, such as methyl esters and ethyl esters, of these acids. The aliphatic dicarboxylic acids or their derivatives may be used, alone or in combination.

The aromatic or alicyclic carboxylic acids useful in the present invention are exemplified by terephthalic acid, phthalic acid, isophthalic acid, naphthalene 2,6-dicarboxylic acid, diphenylsulfone dicarboxylic acid, diphenylmethanedicarboxylic acid, diphenyletherdicarboxylic acid, diphenoxyethanedicarboxylic acid, and cyclohexanedicarboxylic acid. Useful derivative moieties of these aromatic or alicyclic carboxylic acids are alkylene esters. Preferably, the aromatic or alicyclic carboxylic acids or their derivatives are added at an amount of not more than 60 mol parts based on the total moles of the aliphatic dicarboxylic acids containing 2–14 carbon atoms and/or their derivatives. For example, if the aromatic or alicyclic carboxylic acids are used at an amount of more than 60 mole parts, the resulting polyester products are improved in thermal properties and mechanical properties, but significantly deteriorated in degradability.

As the glycol group, alkylene glycols, such as ethylene glycol, propylene glycol, 1,3-butanediol, 1,5-pentanediol, 1,6-hexanediol, 1,4-cyclohexanediol, hexamethylene glycol, polyethylene glycol, triethyl glycol, 1,3-propanediol, 1,2-propanediol, neopentyl glycol, propylene glycol, tetramethylene glycol, alicyclic diols, and aromatic diols, such as bisphenol A and bisphenol S, are used alone or in combination.

In accordance with the present invention, a preferable polyester can be prepared from an aliphatic dicarboxylic acid component group comprising a basic acid mixture of succinic acid, adipic acid and glutaric acid or a basic acid ester mixture of dimethyl succinate, dimethyl adipate and dimethyl glutarate, an aromatic or alicyclic dicarboxylic acid component group comprising dimethylterephthalate, dimethylterephthalate-based dimethyl dicarboxylic acid, or its derivatives, and an alkylene glycol, such as tetramethylene glycol.

Polyfunctional compounds, such as trimesic acid, trimethylol propane, glycerin, and monofunctional compounds, such as stearyl alcohol, palmitic acid, bezoic acid, and naphthonic acid, may be effectively used as terminators.

The composite catalyst used in the present invention comprises about 30–85 weight parts of a titanium compound, about 5–30 weight parts of a zinc compound, about 5–30 weight parts of an antimony compound, and about 5–10 weight parts of a phosphorous compound. Preferably, the titanium compound is used at an amount of about 40–60 weight parts.

The composite catalyst is preferably dissolved at an amount of 5–20 weight parts in alkylene glycol. The weight ratio of the composite catalyst to the reactant ranges from about 0.001 to 0.04 and preferably from 0.005 to 0.02. For example, if the composite catalyst departs from the range, the reaction rate is remarkably decreased or the resulting polyesters are colored black.

In preparing polyesters, the composite catalyst reduces the esterification and polycondensation time as well as improves the color and mechanical properties of the polyesters. In addition to doing its duty as a catalyst, the composite catalyst plays a role as a blowing agent, as well.

In accordance with the present invention, the composite catalyst is prepared by dissolving predetermined amounts of its components in the glycol, e.g. alkylene glycol at 20–240° C. for 3–7 hours and preferably at 140–170° C. for 3–5 hours. Generally, if the metal or metal oxide compounds used in the composite catalyst of the present invention are dissolved in alkylene glycol and stood for a long period of time, they precipitate, which leads to a significant reduction in the stability of the catalyst. However, the composite catalyst prepared in accordance with the present invention does not precipitate and thus, is excellent in stability.

As the titanium compound serving as a catalytic component in the present invention, likewise, there may be used an ether compound represented by the following general formula I:

$$Ti(OR)_4 \qquad (I)$$

wherein Rs, which may be the same or different, each is an aliphatic, alicyclic or aromatic functional group. R is selected from the group consisting of methyl, ethyl, n-propyl, isopropyl, n-butyl, iso-butyl, sec-butyl, tert-butyl, n-amyl, acetylisopropyl, neohexyl, isohexyl, n-hexyl, heptyl, octyl, decyl, dodecyl, octadecyl, cyclopentyl, cyclohexyl, amino, phenyl and benzyl. Preferably is an alkyl containing 10 or less carbon atoms. Examples of the compound represented by the formula I include titaniumtetramethoxide, titaniumtetraethoxide, titaniumtetra-propoxide, titaniumtetraisopropoxide, titaniumtetrabutoxide, and isopropyl(N-ethylenediamino)ethyltitanate.

As another alternative of the titanium compound, there may be used the compound represented by the following general formula II, which consists of the compound of the formula I and a phosphite compound in a mole ratio of 1:2:

$$(RO)_4Ti[HP(O)(OR')_2]_2 \qquad (II)$$

wherein Rs are as defined above, and R's, which may be the same or different, each is an aliphatic, alicyclic or aromatic functional group, and R may be the same with or different from R'. Examples of the compound of the formula II include tetraisopropyldi(dioctyl)phosphitotitanate, tetraoctyldi(distearyl)phosphitotitanate, tetraoctyldi(ditridecyl)phosphitotitanate, and tetra(2,2-diallyloxymethyl)butyldi(ditridecyl)phosphitotitanate with preference to tetraisopropyldi(dioctyl)phosphitotitanate.

As a further alternative of the titanium compound, there may be used the alkoxytitanium compound represented by the following general formula III:

$$ROTi[OM(O)R'']_3 \qquad (III)$$

wherein R is as defined above, R''s, which may be the same or different, each is an aliphatic, alicyclic or aromatic functional group, R may be the same with or different from R'', and M is a carbon atom, phosphorous atom or sulfur atom. When M is a carbon atom, the catalyst shows the best catalytic activity. Examples of the compound of the formula III include monoalkoxytitanate compounds, such as isopropyltriisostearoyltitanate, isopropyldimethacrylisostearoyltitanate, isopropyltri(dodecyl)benzenesulfonyltitanate, alkoxytrimethacryltitanate, isopropyltri(dioctyl)phosphatotitanate and alkoxytriacryltitanate, and neoalkoxytitanate compounds, such as neopentyl(diallyl)oxytrineodecanonyltitanate, neopentyl(diallyl)oxytri(dodecyl)benzenesulfonyltitanate, neopentyl(diallyl)oxytri(dioctyl)phosphatotitanate and neopentyl(diallyl)oxytri(N-ethylenediamino)ethyltitanate with particular preference to isopropyltriisostearoyltitanate, alkoxytriacryltitanate and neopentyl(diallyl)oxytri(N-ethylenediamino)ethyltitanate.

The titanium compounds as represented by the general formulas may be used, alone or in combination.

As a member of the composite catalyst of the present invention, the zinc compound is selected from the group consisting of zinc oxide, zinc acetate, zinc chloride and zinc hydroxide with particular preference to zinc acetate.

Useful examples of the antimony compound serving as a catalytic component, include antimony chloride, antimony acetate and antimony oxide. Antimony oxide is effective and antimony anhydride is most effective.

The phosphorous compound of the composite catalyst serves as a thermal stabilizer. Concrete examples of the phosphorous compound include phosphoric acid compounds, such as phosphoric acid, monomethylphosphate, dimethylpyrophosphate, diethylphosphate, diethylpyrophosphate, diphenylpyrophosphate, dicyclohexylpyrophosphate, dioctylpyrophosphate, trimethylphosphate, triethylphosphate, tri-n-butylphosphate, triphenylphosphate, and trioctylphosphate, phosphite compounds, such as phosphite, dimethylphosphite, diethylpyrophosphite, dicyclohexylphosphite and diphenylphosphite, phosphonic acid compounds, such as dimethylesters of phenyl phosphonic acid and diethylesters of 3,5-di-tert-butyl-4-hydroxybenzylphosphonic acid, and phosphinic acid compounds, such as (4-methoxycarbonylphenyl)phenylphosphonic acid and dimethylester derivatives thereof, and (2-carboxyethyl)methylphosphonic acid and dimethylester derivatives thereof, with preference to phosphoric acid compounds.

As for the addition amount of the composite catalyst, it is not especially limited, but the composite catalyst is added at an amount enough to allow a sufficiently high reaction rate in preparing polyesters. The amount is significantly small as compared with those of conventional catalysts. Based on the total weight of the polyester finally produced, the amount of the composite catalyst comprising the titanium compound, the zinc compound and the antimony compound together, is on the order of approximately 50–5,000 ppm and preferably on the order of approximately 500–2,000 ppm. The composite catalyst may be added at any time of the esterification and polycondensation, but is most preferably added prior to the esterification in order to reduce the reaction time.

When an ester interchange reaction is adopted in the present invention, it is carried out at a temperature of about 180–230° C. and advantageously about 200–220° C. The ester interchange reaction may be proceeded at ordinary pressure or under a pressurized condition. In the case of a direct esterification, the composite catalyst may be used at a reaction temperature of about 160–230° C. For polycondensation, the reaction temperature is on the order of 220–270° C. and preferably 230–250° C. and the reaction pressure is preferably reduced to a final pressure of 1 torr or less slowly over 30 min.

In accordance with the present invention, various additives may be used for the formation of polyesters.

For example, there may be added a hindered phenol compound as an antioxidant, examples of which include pentaerythrityltetrakis[3-(3,5-di-tert-butyl-4-hydroxyphenyl)]propionate, octadecyl-3-(3,5-di-tert-4-hydroxyphenyl)propionate and N,N-hexamethylenebis(3,5-di-tert-4-hydroxyhydrocinnamide with preference to pentaerythrityltetrakis[3-(3,5-di-tert-butyl-4-hydroxyphenyl)]propionate. Alkaline metal compounds such as sodium hydroxide and potassium hydroxide, alkaline earth metal compounds, such as potassium acetate, may be added. In addition, 3,5-diethyl-2,4-diaminotoluene and/or hydroquinonebis(2-hydroxyethyl)ether may be added as a chain extender for the formation of polyester, cobalt acetate as a controlling agent, cardanol and/or gylceryl acetate as a fluxinal agent, silica, alumina and/or benzenesulfone amide as a nucleating agent, octocrilene as a UV absorber, and/or triethylamine as a softening point-lowering preventive under the condition that their addition should not depart from the objects of the present invention.

As described above, the composite catalyst of the present invention significantly curtails the reaction time of both esterification and polycondensation as well as allows the formation of the polyesters which are superior in biodegradability and much improved in mechanical and thermal properties, compared with conventional techniques.

A better understanding of the present invention may be obtained in light of the following examples which are set forth to illustrate, but are not to be construed to limit the present invention.

In the following examples and comparative examples, the term "parts", unless specially mentioned, means "weight parts". The intrinsic viscosity [$\eta_{int}$] of a polymer was measured at 25° C. in its film state using a color difference meter.

The L and b values obtained from the intrinsic viscosity are the indexes of lightness and yellowing of the polymer, respectively.

The color of the polymer is improved as the L value is larger and the b value is smaller.

As for melt index, it was represented by the grams of the sample which was obtained at a temperature of 160 and 190° C. for 10 min under a load of 2,160 g.

Evaluation for biodegradability was made by maintaining 5 weight parts of each of the samples, based on the total weight of a standard compost, at 55° C. for 16 weeks and measuring the carbon dioxide gas generated. The biodegradability of the samples was represented by percentages of the measured carbon dioxide to the calculated carbon dioxide.

EXAMPLE I 143.1 g of a basic ester group (consisting of 21 parts of dimetylsuccinate, 16 parts of dimethyladipate, 62 parts of dimethylglutarate and 1 part of another material), 116.4 g of dimethylterephthalate, and 202.8 g of tetramethylglycol were introduced to a reaction bath. While always maintaining the molar ratio of reactants at 1.5, a composite catalyst was added at an amount of 2000 ppm in the reaction bath equipped with a stirrer, a reflux condenser and a heater. The reactants were esterified for 2 hours at 200° C. while draining the methanol, a by-product out of the reaction system. The composite catalyst was obtained by dissolving 1 g of antinomy trioxide, 1 g of zinc acetate and 8 g of isopropyltriisostearoyltitanate in 90 g of ethylene glycol and heating the solution at 70° C. for 2 hours with stirring.

200 g of the product thus esterified was placed in a reactor and polycondensed at 250° C. for 2.5 hours in the presence of 100 ppm of trimethylphosphate, to give a polyester.

The polyester was molded to a polyester film which was, then, measured and evaluated regarding general properties. The results are given as shown in Table 1, below.

EXAMPLES II THROUGH IV

Polyesters were prepared in the same manner as that of Example I, except for using 119.3 g of the basic ester group and 145.6 g of dimethylterephthalate in Example II, 167.0 g of the basic ester group and 87.3 g of dimethylterephthalate in Example III, and 95.4 g of the basic ester group and 174.6 g of dimethylterephthalate in Example IV.

EXAMPLES V THROUGH VII

Polyesters were prepared in the same manner as that of Example I, except for, instead of isopropyltriisostearoyltitanate, alkoxytriacryltitanate in Example V, neopentyl(diarylyl)oxytrineodecanonyltitanate in Example VI, and neopentyl(diallyl)oxytri(N-ethylenediamino)ethyltitanate in Example VII, when preparing the composite catalyst.

EXAMPLES VIII THROUGH X

Polyesters were prepared in the same manner as that of Example I, except for, instead of the composite catalyst, using 2,000 ppm of titaniumtetrabutoxide in Example VIII, 5,000 ppm of titaniumtetrabutoxide in Example IX, and 5,000 ppm of titaniumtetraisopropoxide in Example X, for the esterification.

COMPARATIVE EXAMPLES I THROUGH V

The same procedure of Example I was repeated, except that the monomers and the catalyst were changed. 219.3 g of dimethylsuccinate and 202.8 g of tetramethylene glycol in Comparative Example I, 131.4 g of dimethylsuccinate, 17.4 g of dimethyladipate and 202.8 g of tetramethyleneglycol in Comparative Example II, 131.4 g of dimethylsuccinate, 17.4 g of dimethyladipate, 14.0 g of ethyleneglycol in Comparative Example III, and 118.3 g of dimethylsuccinate, 15.7 g of dimethyladipate, 116.4 g of dimethylterephthlate and 202.8 g of tetramethyleneglycol in Comparative Example IV were used while 5,000 ppm of titaniumtetrabutoxide as a catalyst was fed at an early stage of the esterification. The polymer used in Comparative Example V was a low-density polyethylene which is usually used for molding blowing films.

TABLE 1

| Exam. Nos. | Intrin. Visco. (dl/g) | Melt Point (° C) | Color ΔL | Color Δb | Tensile Strength (kg/cm$^2$) | Elong. (%) | Tear Strength (kg/cm) | Melt Index (160/190°) | [1]Biodegradability (%) |
|---|---|---|---|---|---|---|---|---|---|
| 1 | 0.83 | 119 | 66 | 1.8 | 212 | 1023 | 186 | 0.7/1.2 | 37 |
| 2 | 0.69 | 128 | 66 | 1.7 | 274 | 730 | 220 | 0.5/1.0 | 28 |
| 3 | 0.87 | 102 | 65 | 2.5 | 122 | 1358 | 161 | 0.8/1/5 | 31 |
| 4 | 0.61 | 145 | 68 | 1.9 | 353 | 456 | 248 | 0.4/0.8 | 15 |
| 5 | 0.82 | 115 | 68 | 1.8 | 212 | 1050 | 188 | 0.7/1.2 | 27 |
| 6 | 0.80 | 113 | 67 | 2.0 | 218 | 1035 | 185 | 0.7/1.3 | 28 |
| 7 | 0.81 | 114 | 66 | 1.7 | 214 | 1043 | 186 | 0.7/1.2 | 25 |
| 8 | 0.79 | 112 | 65 | 3.3 | 217 | 1038 | 187 | 0.7/1.3 | 28 |
| 9 | 0.83 | 114 | 60 | 5.6 | 213 | 1049 | 186 | 0.7/1.2 | 27 |
| 10 | 0.81 | 113 | 61 | 4.8 | 208 | 1041 | 188 | 0.7/1.3 | 29 |

TABLE 1-continued

| Exam. Nos. | Intrin. Visco. (dl/g) | Melt Point (° C) | Color ΔL | Color Δb | Tensile Strength (kg/cm$^2$) | Elong. (%) | Tear Strength (kg/cm) | Melt Index (160/190°) | [1]Bio- degrad- ability (%) |
|---|---|---|---|---|---|---|---|---|---|
| C.1 | 0.61 | 115 | 65 | 1.8 | 270 | 140 | 257 | 3.9/230.2 | 25 |
| C.2 | 0.66 | 100 | 64 | 2.1 | 143 | 308 | 167 | 1.8/63.2 | 27 |
| C.3 | 0.64 | 90 | 65 | 2.0 | 113 | 480 | 90 | 2.3/83.8 | 24 |
| C.4 | 0.71 | 105 | 66 | 1.8 | 220 | 704 | 81 | 1.3/46.9 | 17 |
| C.5 | — | 120 | 70 | 1.2 | 285 | 741 | 129 | 0.4/0.6 | 0 |

[1]degraded after 16 weeks

Industrial Applicability

As described hereinbefore, the composite catalyst comprising the titanium compound, zinc compound, antimony compound and phosphorous compound significantly improves the reaction rate of polyester polymerization as well as increases the production amounts of polyester, as compared with conventional catalysts. In addition, the introduction of an aromatic or alicyclic carboxylic acid or its derivative as a part of the carboxylic acid component, in cooperation with the catalytic activity of the composite catalyst, results in high-molecular weight polyesters which are excellent in thermal and mechanical properties in addition to showing good biodegradability. The biodegradable polyesters of the present invention can replace preexisting, expensive aliphatic polyesters.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A process for forming a polyester, in which a carboxylic acid monomer group comprising at least one aliphatic dicarboxylic acid containing 2 to 14 carbon atoms and at least one aromatic or alicyclic carboxylic acid, and at least one glycol are subjected to esterification and polycondensation in the presence of a composite catalyst comprising a titanium compound, a zinc compound, an antimony compound and a phosphorous compound.

2. A process as set forth in claim 1, wherein said aliphatic dicarboxylic acid containing 2 to 14 carbon atoms is selected from the group consisting of succinic acid, glutaric acid, malonic acid, oxalic acid, adipic acid, sebacic acid, azelaic acid, nonandicarboxylic acid, alkyl derivatives thereof, arylester derivatives thereof, and the mixtures thereof.

3. A process as set forth in claim 1, wherein said aromatic or aliphatic carboxylic acid is selected from the group consisting of terephthalic acid, phthalic acid, isophthalic acid, naphthalene 2,6-dicarboxylic acid, diphenylsulfonedicarboxylic acid, diphenylmethanedicarboxylic acid, diphenyletherdicarboxylic acid, diphenoxyethanedicarboxylic acid, cyclohexanedicarboxylic acid, alkylene esters thereof, and the mixtures thereof, and is present at an amount of 60 mole parts or less based on the total moles of said aliphatic dicarboxylic acid containing 2 to 14 carbon atoms.

4. A process as set forth in claim 1, wherein said glycol group is selected from the group consisting of ethyleneglycol, propyleneglycol, 1,3-butanediol, 1,6-hexanediol, 1,4-cyclohexandiol, hexamethyleneglycol, polyethyleneglycol, triethyleneglycol, 1,3-propanediol, 1,2-propanediol, neopentylglycol, propyleneglycol, tetramethyleneglycol, alicyclic diols, bisphenol A, bisphenol S, and the mixtures thereof.

5. A process as set forth in claim 1, wherein said dicarboxylic acid and said glycol are maintained at a reaction molar ratio of 1:1.2–1:2.3, and said esterification and said polycondensation are carried out at a temperature of 170–210° C. and 230–260° C., respectively.

6. A process as set forth in claim 1, wherein said composite catalyst comprises about 30–85 weight parts of the titanium compound, about 5–30 weight parts of the zinc compound, about 5–30 weight parts of the antimony compound and about 5–10 weight parts of the phosphorous compound, and is added at a weight ratio of 0.001–0.05 per weight of the reactants.

7. A process as set forth in claim 6, wherein said titanium compound is selected from the group consisting of a compound represented by the following general formula I:

$$Ti(OR)_4 \qquad (I)$$

wherein Rs, which may be the same or different, each is an aliphatic, alicyclic or aromatic functional group; a compound represented by the following general formula II:

$$(RO)_4Ti[HP(O)(OR')]_2 \qquad (II)$$

wherein Rs are as defined above, and R's, which may be the same or different, each is an aliphatic, alicyclic or aromatic functional group, and R may be the same with or different from R'; a compound represented by the following general formula III:

$$ROTi[OM(O)R'']_3 \qquad (III)$$

wherein R is as defined above, R''s, which may be the same or different, each is an aliphatic, alicyclic or aromatic functional group, R may be the same with or different from R'', and M is a carbon atom, phosphorous atom or sulfur atom; and the mixtures thereof.

8. A process as set forth in claim 6, wherein said zinc compound is selected from the group consisting of zinc oxide, zinc acetate, zinc chloride, zinc hydroxide and the mixtures thereof.

9. A process as set forth in claim 6, wherein said antimony compound is selected from the group consisting of antimony chloride, antimony acetate, antimony oxide and the mixtures thereof.

10. A process as set forth in claim 6, wherein said phosphorous compound is selected from the group consisting of phosphoric acid compounds, phosphite compounds, phosphonic acid compounds, phosphinic acid compounds and the mixtures thereof.

11. A process as set forth in claim 1, wherein said composite catalyst further comprises a hindered phenol compound.

12. A polyester formed by the process of any one of claim 1.

13. A polyester formed by the process of claim 2.

14. A polyester formed by the process of claim 3.

15. A polyester formed by the process of claim 4.

16. A polyester formed by the process of claim 5.

17. A polyester formed by the process of claim 6.

18. A polyester formed by the process of claim 7.

19. A polyester formed by the process of claim 8.

20. A polyester formed by the process of claim 9.

21. A polyester formed by the process of claim 10.

22. A polyester formed by the process of claim 11.

* * * * *